Patented June 10, 1941

2,245,309

UNITED STATES PATENT OFFICE 2,245,309

METHOD OF MANUFACTURING DRIED STARCH CONVERSION PRODUCTS

James F. Walsh, Yonkers, N. Y., assignor to American Maize-Products Company, a corporation of Maine No Drawing. Application April 26, 1940, Serial No. 331,757

5 Claims. (Cl. 127—30)

My invention relates to the manufacture of dried starch conversion products and more particularly to a method of making a dried solidified starch conversion syrup product which is adapted to be packaged and stored for reasonably long lengths of time without caking or lumping. This application contains subject matter related to that of my Patent No. 2,189,824 issued February 13, 1940, and covers modifications and improvements of the method disclosed in that patent.

A commercial example of the product of my present invention is dehydrated solidified corn syrup produced by the acid conversion of corn starch and then subjected to dehydrating and solidifying treatments described hereafter. The product of this invention, however, may be produced from syrups derived from any other suitable types of starch including the root, tuber and cereal starches such as for example, starches obtained from tapioca, potato, corn, wheat, rice, peas and beans. The conversion of the starch into the syrup which is to be dehydrated and solidified may be effected by acid or enzymes or combinations thereof.

Because of the hygroscopic properties of the dried products obtained from solidified corn syrup or similar starch conversion syrups it is necessary to reduce the usual moisture content of these syrups down to a very low value such as for example, a range of 1% to 4% moisture, to prevent the dried product from caking or lumping when packaged and stored. To effect such dehydration requires long heating or cooking of the syrup and this normally causes caramelization or other decomposition of the syrup product. These objectionable results may be overcome by the processes described in my above patent which comprise principally the cooking down of the syrup in relatively small batches and preferably in the presence of a very small amount of a sulphur dioxide liberating agent followed by quick cooling of the syrup in relatively thin films such as by depositing the dehydrated syrup material on a chilled metal belt or a chilled roller. In this and all prior art processes it has definitely been the aim or purpose to eliminate as much of the water content of the syrup as possible and in all of the treatments of the syrup for producing the final dried product to keep the syrup away from water.

In accordance with my present invention I have made the surprising discovery that the desired type of solidified starch conversion syrup product substantially free of caramelization may be produced by first dehydrating the syrup properly to a low moisture content such as 4% or less and at this stage subjecting the heavy concentrated viscous syrup to direct treatment with water at a relatively very low temperature. This effect is surprising and unexpected in view of the known high solubility of corn syrup or the like in water, and in fact the strong hygroscopic tendency of this syrup to take up water rapidly from the atmosphere or by actual contact with water. I have discovered that, provided the temperature of the water is lowered sufficiently below the normal room temperature or the temperature of tap water, that the solubility of the starch conversion syrup in the water will be reduced to a sufficient extent to enable solidifying of the dehydrated syrup by actual contact with the cold water. This has the advantage of a very simplified and inexpensive procedure and eliminates the prior necessity of artificially chilled metal belts or chilled metal rollers for solidifying the syrup.

Generally speaking I have found that a satisfactory solidified starch conversion syrup product may be produced by dehydrating the syrup to a moisture content of around 3% or less (using proper conditions to prevent caramelization of the syrup such as described above) and then bringing the hot syrup promptly and rapidly into contact with cold water which may be at a temperature of about 0° C.–5° C. The temperature of the syrup just prior to coming into contact with the cold water in the usual case would be within the range of about 135° C.–145° C. The rapidity with which the dehydrated liquid syrup is brought into a stable solid form is such that the syrup does not have an opportunity to caramelize. In other words, the solidification can be effected practically instantaneously when the hot syrup strikes the cold water. This rapid cooling of the syrup down to a stabilizing temperature will prevent any discoloration of the syrup such as is usually caused by the long protracted cooling treatment of the dehydrated syrup when allowed to solidify in pans at room temperature, which is the usual practice.

After the dehydrated syrup has been quickly solidified to solid form as described above by actual contact with the water, it is promptly removed from the water and subjected to treatment with heated air which removes the surface moisture from the solidified syrup. The mass of the syrup coming into contact with the water does not pick up an appreciable amount of moisture because of the relatively very low temperature of the water. However, some of the water remains on the surface of the solidified syrup material by natural surface adhesion or attraction and this water is removed easily and quickly by treatment with the heated air. This hot air treatment is preferably carried out in a humidity controlled atmosphere, that is, the humidity of the heated air itself is preferably controlled to a relatively low value so that the solidified syrup product will not take up additional moisture during this treatment.

After the syrup has been solidified and the surface water removed as above, the solidified syrup mass may be subjected to any desired mechanical treatment to reduce the mass to smaller sized particles. If desired the mass may be ground to a fine white powdery form or it may be simply broken up into lump form as desired. It is to be noted in this connection that the previous treatments of the syrup with cold water and air do not effect substantial comminution of the syrup product, that is, it stays in substantially solid mass form throughout the treatment.

The details of this invention are further described with particular reference to corn syrup, but it is to be understood that the invention is not limited thereto and the procedure may be applied with necessary modifications to any desired starch conversion syrup which is normally soluble or substantially soluble in water and which may be solidified by sudden chilling of the dehydrated syrup with the water at a temperature sufficiently low to prevent substantial absorption of the water by the syrup.

The usual procedure for producing a converted corn syrup suitable for use in this invention, is to subject a corn starch-water suspension to the action of heat, pressure and a starch conversion acid such as hydrochloric acid. By this treatment the starch is converted into a mixture of dextrins and reducing sugars, namely, maltose and dextrose, the amount of reducing sugars formed under standard conditions being dependent upon the length of the time employed for the conversion reaction. The resulting conversion liquor is neutralized, filtered, bleached and concentrated to a heavy syrup of the desired Baumé according to known processes. This type of syrup forms the starting material for this invention.

In accordance with one illustrative but nonlimiting embodiment of this invention, a substantially dry, storable syrup product having a relatively light color and being stable against caking and lumping over reasonably long periods of time may be prepared as follows:

To a batch containing 1600 to 1700 pounds of actual sugar solids in a 30° to 42° Baumé corn syrup solution, is added 300 cc. of sodium bisulphite solution containing 31% sulphur dioxide. The mixture is then carefully gradually cooked down until its moisture content is below about 4% and preferably below 3%. This can be done in any desired type of equipment, but is preferably carried out with stirring in a vacuum pan or a series of pans. If desired, the first part of the concentration may be carried out in a pan or pans to a point where the moisture content is in the order of 6% to 7%, and then rapidly effecting the final drying by pouring the syrup in the form of thin films on a heated drum or similar hot surface. This procedure for the final dehydration is not necessary, however, since the entire dehydration process may be carried out in the vacuum pans. Toward the end of the concentration treatment in the vacuum pan or pans 500 cc. of 36% acetic acid is added to the syrup and the mixture stirred. This acid apparently reacts with any remaining sodium bisulphite which has not decomposed, and forms sodium acetate and gaseous sulphur dioxide. The latter is removed by the heat applied during the last stages of concentration of the syrup. In this manner only a small amount of harmless sodium acetate remains in the final sugar product and the excess sulphur dioxide is removed down to a point where that remaining does not affect the edible properties of the final product. The acid, as above explained, neutralizes the alkalinity caused by the sodium bisulphite and its decomposition and gives the syrup an acid pH which is conducive to clarity of the syrup.

After having dehydrated the syrup as above described to the desired low moisture content of about 3% or less, the resulting heavy syrup is deposited on a moving belt which carries the syrup, now at a temperature of about 140° C., through water in any suitable form of container, the water being at a temperature of about 0° C. The rate of movement of the hot syrup through the volume of water is adjusted so that the syrup is in contact with the water for just sufficient length of time to effect solidification. In the usual case the syrup need not be in contact with the cold water more than about a minute or two.

As the solidified syrup is removed from the water on the moving belt, it is next carried through a drying chamber wherein it is subjected to air at a temperature of about 75° C. and a relative humidity of about 15%. In this drying chamber the water adhering to the surface of the solidified syrup mass is removed substantially by evaporation. After passing through the drying chamber the solidified dried syrup product is then removed from the belt by any suitable means and is further mechanically treated to reduce the solid material to the desired particle size.

Various modifications and changes may be made in the above described method, products and materials without departing from the scope of my invention, some of the novel features of which are defined in the appended claims.

I claim:

1. A method for producing a substantially dried starch conversion syrup product adapted to be packaged, shipped and stored for a reasonably long length of time without caking or lumping, comprising heating and dehydrating a starch conversion syrup in a vacuum evaporator to reduce the normal moisture content of the syrup to not more than about 4%, promptly subjecting the resulting hot dehydrated syrup to chilling in water having a temperature not above about 5° C. which quickly solidifies the hot syrup, promptly separating the solidified syrup from excess of water, and then treating the solidified material with heated air of relatively low humidity to effect removal of any surface water from the solidified syrup mass.

2. A method of producing a substantially dried solidified starch conversion syrup product comprising dehydrating the syrup to a moisture content of about 1%-4%, subjecting the dehydrated heavy viscous syrup at a temperature of at least about 135° C. to the chilling and solidifying action of water which is at a temperature not higher than about 5° C., promptly separating the thus solidified syrup from excess of water, and then treating the solidified syrup to remove any adhering surface moisture.

3. In a process for producing a dried solidified starch conversion syrup product, the steps of bringing hot, water soluble, concentrated starch conversion syrup containing not more than about 4% moisture and having a temperature of at least about 135° C. into direct contact with water maintained at a sufficiently low temperature not substantially above 5° C. to render the hot starch conversion syrup substantially insoluble in said water for a relatively short period of time so as to effect solidification of the syrup into a substantially solid mass, and subjecting the solidified syrup mass to heated air of relatively low humidity to remove surface moisture from said syrup mass.

4. A process for producing solidified corn syrup comprising converting corn starch to produce a syrup having a reducing sugars content of about 25%–65%, dehydrating the syrup to a moisture content of about 1%–4% while preventing caramelization of the syrup, causing the dehydrated heated syrup at a temperature of about 135° C.–145° C. to come into direct contact with water at a temperature of about 0° C. to 5° C. for sufficient length of time to effect solidification of the dehydrated syrup, removing the dehydrated syrup product promptly from the water and subjecting the dehydrated syrup mass to heated humidity controlled air to effect removal of the surface water from the solidified syrup mass and comminuting the solidified syrup material to the desired particle size.

5. A process as defined in claim 4 in which the heated humidity controlled air used for removing the surface water from the solidified syrup is at a temperature of around 75° C. and has a relative humidity of about 15%.

JAMES F. WALSH.